Oct. 12, 1937.   H. A. MILLER   2,095,393
TRANSMISSION
Filed March 12, 1935   2 Sheets-Sheet 2
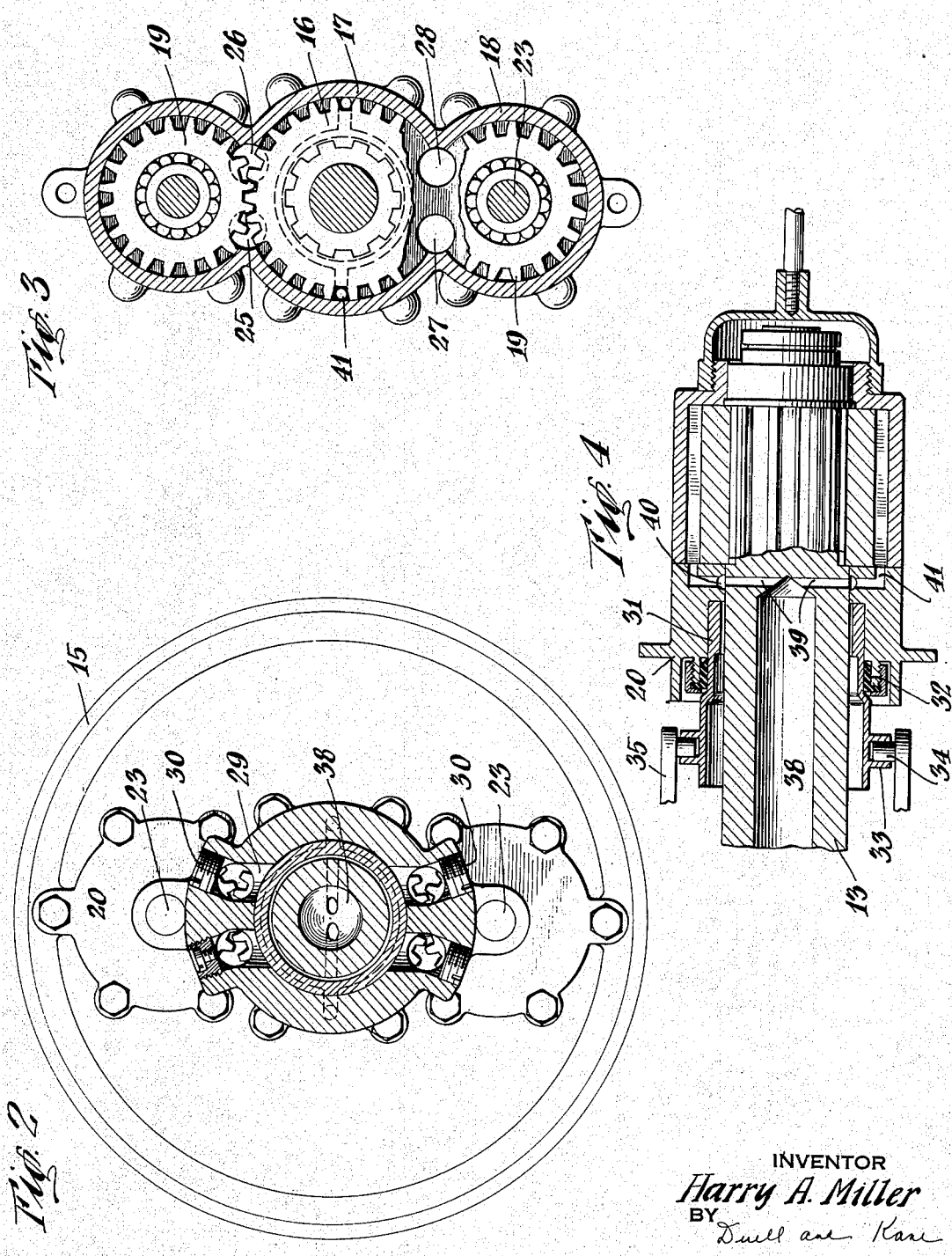
INVENTOR
*Harry A. Miller*
BY
ATTORNEYS Patented Oct. 12, 1937

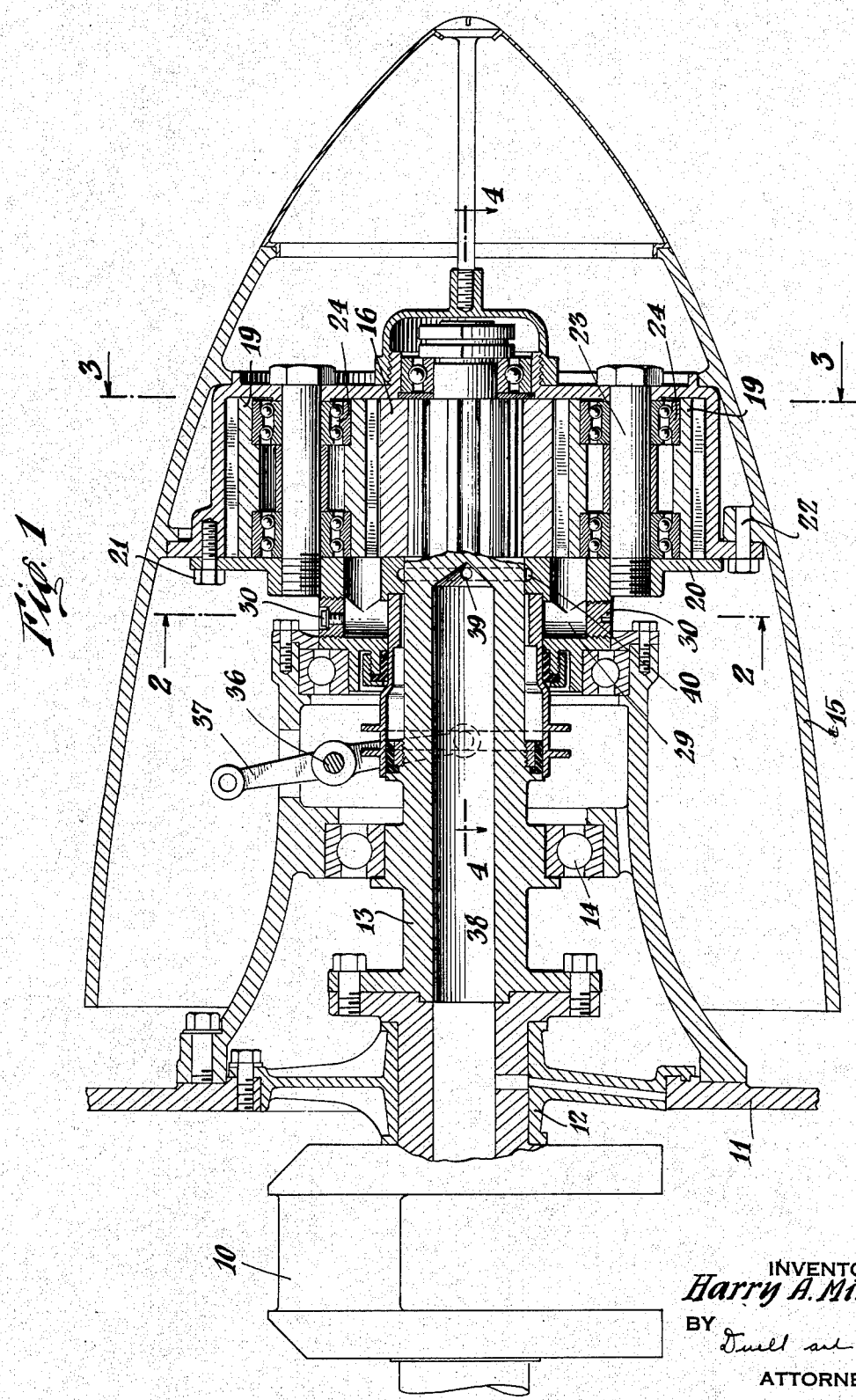

2,095,393

UNITED STATES PATENT OFFICE 2,095,393

TRANSMISSION

Harry A. Miller, New York, N. Y., assignor, by mesne assignments, to H. A. Miller Engineering Corporation, a corporation of New York Application March 12, 1935, Serial No. 10,592

1 Claim. (Cl. 192—61)

This invention relates to a functionally and structurally improved transmission, and more especially a hydraulic transmission.

It is an object of the invention to provide an apparatus of this nature which may be utilized in any number of different associations and by means of which a driven member may be coupled to a driving member in such manner that a virtually infinite ratio of drive between the members is feasible.

A further object of the invention is that of providing a hydraulic transmission involving relatively few parts each individually rugged and simple in construction and which parts may be provided to furnish a unitary structure operating over long periods of time with freedom from difficulties.

Still another object is that of providing a transmission unit which will embody a control to be operated in a very simple manner either by the person in charge of the apparatus or by any proper automatic form of mechanism. Moreover by means of this control the ratio of drive between the driving and driven members may be controlled with nicety, and the transmitting apparatus will be of such nature that there will be a minimum of leakage aside from the fact that such leakages as do occur will be immediately compensated for.

With these and other objects in mind, reference is had to the attached sheets of drawings illustrating practical embodiments of the invention, and in which—

Fig. 1 is a sectional side view of the transmission as embraced within the "nose" of an air propeller assembly;

Fig. 2 is a transverse sectional view taken along the lines 2—2 and in the direction of the arrows as indicated in Fig. 1;

Fig. 3 is a further transverse sectional view taken along the lines 3—3 and in the direction of the arrows as indicated in Fig. 1; and Fig. 4 is a fragmentary sectional plan view taken along the lines 4—4 and in the direction of the arrows as indicated in Fig. 1.

In these drawings the invention has been illustrated in special associations. As will hereinafter be apparent, the uses of the invention are manifold, and a transmission embodying the present invention might be variously employed, and the structure—if necessary—modified according to the particular needs of any installation.

Thus referring to Figs. 1 to 4, it will be noted that the numeral 10 indicates what may be the crank shaft of an internal combustion engine and which extends beyond casing 11 and through bearing 12. This shaft is coupled to a drive shaft 13 rotatably supported by bearings 14 and if as illustrated the transmission is to be employed in connection with a propeller drive, this drive shaft may be enclosed within a spinner or "nose" casing 15.

Secured to the forward end of the drive shaft, as has been shown in Fig. 3, is a gear 16 which is enclosed within a casing 17 having extensions or compartments 18 adjacent its ends. Housed within the latter compartments are gears 19 which as shown may have a relatively reduced diameter and the teeth of which mesh with the teeth of gear 16. The casing 17—18 fits closely against these gears so that there will be substantially no space between the side faces of the latter and the inner casing faces, it being understood that one of these faces may include the cover portion 20 as has been shown in Figures 1 and 2. While in the embodiment illustrated no packing or washers have been shown, it will be appreciated that they might be provided if desired, but in any event the cover 20 is secured in position against any possibility of displacement, as for example by bolts 21, and the entire casing is secured to the spinner 15 by means of bolts 22 or otherwise, it being appreciated that any desirable number of coupling points may be provided between these parts, although only two points of coupling have been illustrated.

The gears 19 are preferably mounted for rotation with respect to the casing upon shafts 23, it being noted that bearings 24 may be interposed between these parts. These shafts may include head portions at one end, and may have their opposite ends screw-threaded for suitable engagement with recesses or openings formed in the cover 20. In this manner a compact assembly is provided, and it will be understood that if the shell 15 is held in fixed position, the drive shaft 13 may be freely rotated, and this will result merely in the gear 16 being correspondingly rotated to freely drive without any effective drive resulting.

Now with a view to securing such a drive, it will be observed that as shown the cover may be formed with pairs of ports 25—26 and 27—28. The ports of each pair are disposed one to each side of the zones of engagement of the gears 16 and 19. The cover is enlarged and bored so that the ports 25 to 28 may be continued in the form of inwardly extending passages 29. Obviously the outer end of these passages may be capped as at 30, so that a properly sealed system is provided. The cover is, of course, formed with an opening, so that the driving shaft 13 may pass therethrough. This opening is of sufficient area to slidably accommodate a valve member which is in the nature of a sleeve 31 concentrically disposed with reference to the shaft 13 and which in its projected position (as shown in Figures 1 and 4) seals the inner ends of the passages 29 to thus prevent any circulation of fluid from one passage to the other. The cover may likewise be formed with a recess within which may be disposed a suitable packing assembly 32, in engagement with the exterior face of the sleeve or valve 31, so that leakage at this point will be reduced to a minimum.

As a consequence of this construction it will be understood that if the casing portions 17—18 are filled with a suitable fluid, as for example oil, and if the parts are in the positions illustrated, a rotation of the drive shaft 13 will result in a corresponding movement on the part of the gear 16 which, as aforebrought out, will tend to cause rotation of the gears 19. However, assuming that the gear 16, as shown in Fig. 3, is moving in a clockwise direction, the fluid will tend to be impelled by the gears 19 and flow, for example, from the ports 26 and 27 towards the ports 25 and 28 respectively. With the valve 31 projected, no fluid may escape from these ports. Consequently, with the fluid unable to bodily flow past the engagement zone of the teeth 16 and 19, these gears are, in effect, locked against rotation with respect to each other, and it is thus clear that a rotation of the gear 16 will result in a rotation of the casing 17 with the gears 19 remaining substantially stationary with respect to their shafts 23. Thus, the spinner 15 or other part coupled to the casing will be correspondingly moved to drive any mechanism associated therewith.

If, however, the sleeve or valve 31 is retracted to partially uncover the inner ends of passages 29, it will be apparent that the gears 19 may rotate with respect to the gear 16 as the latter is driven, such rotation being dependent upon the fluidity of the liquid employed and more especially upon the degree to which it may escape from ports 25 and 28 and reenter the casing through ports 26 and 27 respectively. This will, of course, depend upon the degree to which the valve or sleeve 31 has been shifted, and it is obvious that if the valve has been fully retracted, and if the ports are of adequate area, the shaft 13 may be rotated as desired without transmitting any driving force to the spinner 15 (other than would naturally result from frictional engagement of the parts).

Now with a view to controlling the shifting of the valve, it will be observed that any suitable mechanism might be employed. For example, the sleeve 31 may present flange portions 33 engaged by pins 34 forming a part of yoke 35. The latter is pivotally mounted as at 36, and is continued beyond this point of mounting in the form of a lever 37 which may be coupled to a control (not shown) so that the sleeve may readily be shifted. Thus by simply shifting the lever 37, the propeller or other part connected to the spinner or its equivalent may be driven at any desired speed up to a speed equal to that of the shaft 13.

While the transmission thus provided may comprise a completely sealed assembly, it is desirable that provision be made for constantly coupling this assembly with a supply of reserve fluid so that in the event leakage does occur such leakage may be compensated for. With this in mind the drive 13 is preferably formed with a bore 38 which is coupled to, for example, the oil pump of the motor in any desired manner (not shown). The bore 38 communicates with passages 39 and the cover 20 is formed with an annular groove 40 registering with the end of these passages and in turn communicating with passages 41 which preferably terminate at the inner faces of the casing and in line with the zone of travel of the teeth of gear 16 and intermediate the zones of engagement of these teeth with the teeth of gears 19. Due to this construction it will be apparent that while oil or other liquid within the bore 28 will be under pressure, this pressure will not have to be so great as to overcome the pressures existing within the operating parts of the transmission. Also, there will be no danger of the liquid within the latter tending to escape through passages 31 into the bore 38. With the parts arranged as shown, it will additionally be obvious that any escape of oil or other liquid from the transmission will be extremely negligible, this being particularly true due to the packing 32 and/or other packing which may be employed.

Thus, among others, the several objects of the invention as aforenoted are achieved. It will be appreciated, as aforebrought out, that any number of changes in construction and rearrangement of the parts might be resorted to without departing from the spirit of the invention as defined by the claim.

Having thus fully described the invention, what is claimed is:

A transmission including a driving shaft, a gear secured to said shaft, further gears having their teeth in mesh with said first named gear, a casing rotatably mounting said further gears and enclosing said first named gear, said casing being formed with passages having their inner ends extending in advance and to the rear of the zones in which the teeth of said gears mesh, the bodies of said passages extending rearwardly and inwardly towards the face of the gear-mounting shaft and terminating at a point spaced from the face of said shaft, a valve shiftable to a position between said shaft and the latter ends of said passages to close the same, said casing being formed with further passages communicating with the space within which said further gears are disposed, and said shaft being formed with a fluid transmitting bore connected to said last named casing passages.

HARRY A. MILLER.